United States Patent [19]
Popoff et al.

[11] 4,202,019
[45] May 6, 1980

[54] TIMING CIRCUIT AND METHOD FOR A TRACK FOLLOWING SERVO IN A DATA STORAGE SYSTEM

[75] Inventors: Paul M. Popoff; Siu K. Lee, both of Sunnyvale, Calif.; James J. Touchton, Boulder, Colo.

[73] Assignee: Sperry Rand Corporation, New York, N.Y.

[21] Appl. No.: 880,906

[22] Filed: Feb. 24, 1978

[51] Int. Cl.$^2$ .............................................. G11B 5/09
[52] U.S. Cl. ...................................................... 360/51
[58] Field of Search .................................... 360/51, 77

[56] References Cited
U.S. PATENT DOCUMENTS

| | | | |
|---|---|---|---|
| 3,828,271 | 8/1974 | Schwanaver | 331/1 A |
| 3,994,016 | 11/1976 | Moghadam | 360/77 |
| 4,005,479 | 1/1977 | Hunnicutt et al. | 360/51 |
| 4,008,488 | 2/1977 | Osborne | 360/51 |
| 4,068,269 | 1/1978 | Commander et al. | 360/77 |
| 4,085,427 | 4/1978 | Dunn | 360/77 |
| 4,127,879 | 11/1978 | Kashio | 360/51 |

*Primary Examiner*—Vincent P. Canney
*Attorney, Agent, or Firm*—Thomas H. Olson; Eugene T. Battjer; William E. Cleaver

[57] ABSTRACT

A timing circuit for a track following servo system wherein an odd servo track having a series of prerecorded odd dibits thereon and an adjacent even servo track having a series of even dibits prerecorded thereon are moved with respect to a servo head to induce in the servo head signals that vary with the occurrence of the dibits and have an amplitude representative of the lateral position of the servo head with respect to the servo tracks. The servo head and its associated preamplifier produce a first signal having portions from both odd and even servo tracks and a second signal that is the inverse of the first signal. The first and second signals are processed by parallel identical circuit paths to generate a clocking signal that times the remainder of the data storage system in synchronism with the spacing of dibits on the servo tracks. Each of the parallel identical circuit paths includes a circuit for discriminating between true dibits and spurious noise signals on the servo tracks, a counter circuit for passing only those dibit pulses that occur within a given time interval after the next preceding dibit, and a circuit for producing a timing pulse at a specified time after the preceding pulse to maintain system synchronization even in the absence of a dibit on one of the tracks.

10 Claims, 9 Drawing Figures

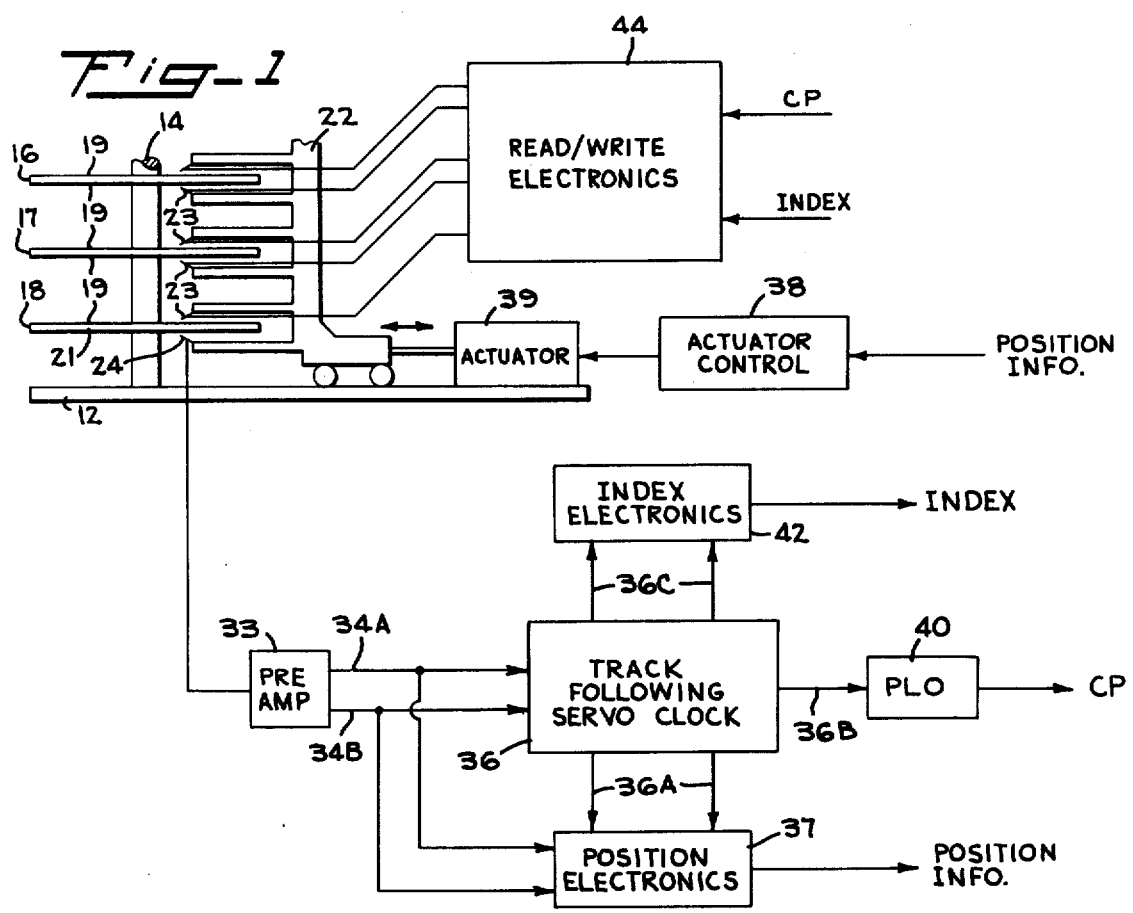
Fig-1
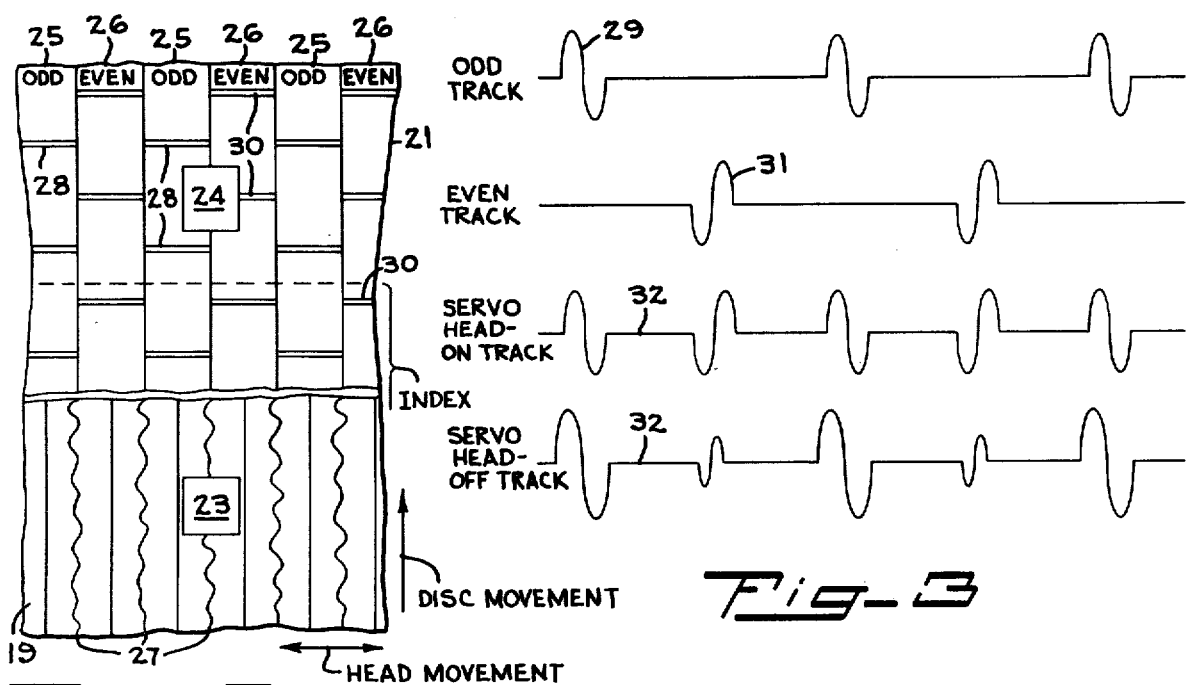
Fig-2
Fig-3

TIMING CIRCUIT AND METHOD FOR A TRACK FOLLOWING SERVO IN A DATA STORAGE SYSTEM

BACKGROUND OF THE INVENTION

1. Field of the Invention

This inventon relates to a timing system for a track following servo system of the type employed with magnetic data storage disk packs having servo data recorded in the form of discrete prerecorded magnetic transitions and more particularly to a timing circuit that achieves accurate clock pulse generation notwithstanding defects in the prerecorded servo tracks.

2. Description of the Prior Art

U.S. Pat. Nos. 3,534,344 and 3,691,543 disclose track following servo systems in which error signals are generated when a servo head is displaced from a path intermediate two oppositely poled servo tracks to restore the servo head to the path. Although the patented systems have met with substantial success, their sensitivity to imperfections in the prerecorded servo tracks imposes unduly stringent requirements on the quality of the disk pack servo surface and the servo data recorded thereon.

Also included in the prior art is a circuit for filling in for dibits missing from the servo tracks to avoid loss of clock synchronization in the absence of one or more dibits. Such prior art circuit includes a counter that is clocked by the system clock pulse and is arranged to produce a preselected count between successive dibits. The counter is reset by a dibit or by a counter output produced at the end of the preselected count so that the counter continues to cycle even in the absence of dibits supplied to the reset input thereof. Such prior art circuit employs only one counter which is reset by dibits from adjacent odd and even servo tracks. Accordingly, the prior art circuit is sensitive to shifts in position of the dibits in one track relative to the position of dibits in the adjacent track, in consequence of which the sync pulses produced by the counter output occur at irregular intervals and thus produce inaccurate clock synchronization.

SUMMARY OF THE INVENTION

According to the present invention the signals induced in the servo head in response to movement of the servo tracks therepast, as well as the inverse of such signal, are processed by two substantially identical channels arranged to generate a timing pulse for system synchronization. Accurate pulse generation is not affected by noise on the servo tracks or by dibits missing therefrom. The circuit of the present invention responds only to true dibits that are spaced from one another by a prescribed amount. The two channels are suitably cross-connected so that defects in one track will be compensated for by dibits in the adjacent track.

One object of the invention is to provide a timing system for a track following servo that is immune to the effects of spurious signals such as noise that exist on the servo track. This object is achieved by providing at the input end of each channel a dibit pulse verifying circuit that rejects noise pulses and passes only dibit signals. Because of cross connections between the channels, the verifying circuits act only on positive going portions of the signals, thereby affording simplification of the circuits.

Further contributing to achievement of the above stated object is a timer circuit in each of the channels which passes only those pulses that appear within a prescribed time interval after a preceding pulse. Thus, in order for a noise pulse to be transmitted through the system, it must have substantially symmetrical positive and negative going portions as well as occurring within a prescribed time interval from a dibit. Because the likelihood of a noise pulse meeting both criteria is extremely remote, noise pulses are effectively eliminated from the circuit.

Another object of the invention is to interconnect the two signal channels referred to above such that the absence of a dibit on one of the two servo tracks will be filled in at an appropriate time by a dibit from the other track. Accordingly, data storage systems having imperfect servo tracks can be employed without significant deterioration in performance of timing and synchronization functions.

Still another object is to provide a system wherein timing is determined by the interval between successive odd dibits and/or the interval between successive even dibits rather than by the interval between even and odd dibits as in the above noted prior art. This object is accomplished by providing two counters, one responsive to even dibits and the other to odd dibits, and by cross coupling the counters such that missing dibits in one track will be filled in by a signal midway between two successive dibits in the other track. Because the interval between dibits on the same track is more accurate and consistent than the interval between dibits in two adjacent tracks, accomplishment of this object provides more accurate timing notwithstanding the absence of dibits in servo tracks.

A timing circuit embodying the present invention provides precise demodulation of the dibit signals induced in the servo head so as to achieve generation of accurate track following position signals as well as precise demodulation of the index information present on each servo track.

The foregoing, together with other objects, features and advantages of the invention, will be more apparent after referring to the following specification and the accompanying drawings.

BRIEF DESCRIPTION OF THE DRAWINGS

FIG. 1 is a partially schematic block diagram of a disk pack storage system with which the timing circuit of the present invention is particularly useful.

FIG. 2 is a composite schematic view showing coaction of the servo tracks and information tracks present in the system of FIG. 1.

FIG. 3 is a timing diagram of the servo signals induced in the servo head in response to movement of the servo track relative to the transducer.

DESCRIPTION OF THE PREFERRED EMBODIMENT

Figure 4:
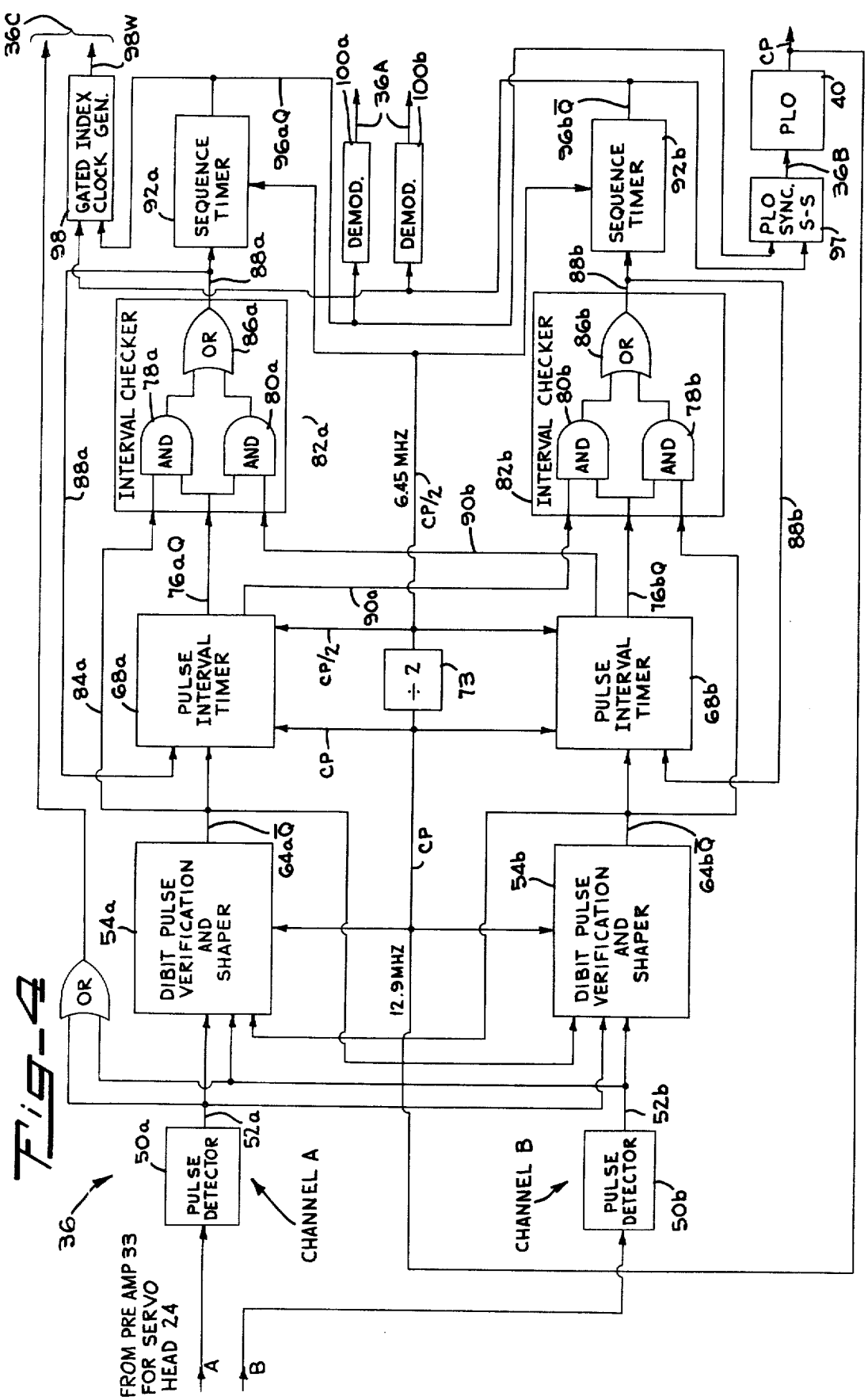
FIG. 4 is a block diagram of a timing circuit embodying the present invention.

A track following servo clock circuit embodying the present invention is employed in a head/disk assembly and more particularly in the control system therefor. In FIG. 1 is schematically shown a base 12 which supports a driven shaft 14 on which a plurality of disks 16, 17 and 18 is mounted so as to be rotatably driven by shaft 14. The upper and lower surfaces of disks 16 and 17 as well as the upper surface of disk 18 constitute information surfaces 19 which are employed to store information and the lower surface 21 of disk 18 stores prerecorded servo data in the form of discrete magnetic transitions or dibits recorded in concentric servo tracks. A carriage 22 is supported for radial movement with respect to shaft 14. The carriage supports read/write heads 23 which cooperate with information surfaces 19 and a servo head 24 which cooperates with servo data surface 21. As is known, it is the purpose of servo head 24 and the servo tracks recorded on surface 21 to provide a servo signal for use in accurately establishing the radial position of carriage 22 with respect to the axis of shaft 14 so as to position read/write heads 23 at any desired radial position. The uniformly spaced dibits recorded on the servo tracks afford regularly recurring pulses which are employed to generate position information and to synchronize system timing in order that information is recorded on information surfaces 19 at a constant linear density regardless of the speed of rotation of shaft 14.

Having reference to FIG. 2, servo head 24 and read/write head 23 are mechanically supported in alignment by carriage 22. As described in somewhat more detail in U.S. Pat. No. 3,534,344, servo surface 21 is composed of a plurality of concentric odd servo tracks 25 which alternate with even servo tracks 26. The servo tracks 25, 26 are radially offset with respect to information tracks 27 on information surface 19 so that when servo head 24 is centered between an odd track and an even track, read/write head 23 is positioned on an information track 27. Odd tracks 25 are formed by a plurality of prerecorded magnetic transitions 28 that are polarized to induce in servo head 24 an odd dibit signal 29 (see FIG. 3) which first goes positive and then negative. Even tracks 26 have a plurality of different prerecorded magnetic transitions 30 that are polarized to induce in servo head 24 even dibit signals 31 which first go negative and then positive. When servo head 24 is positioned midway between an odd track and an even track, a signal 32 is induced in the transducer in response to relative movement between the transducer and the servo surface 21, and the magnitudes of the odd and even dibit signals in each signal are equal. As the servo transducer moves laterally of a path midway between juxtaposed odd and even servo tracks, the relative amplitude of the odd and even dibit pulses induced in servo head 24 varies by an amount proportional to the amount of such lateral movement as shown at 32' in FIG. 3 for the case in which the servo head is offset toward odd track 25. Circuitry not consituting a part of the present invention and therefore not described in detail herein senses the amplitude difference between the odd and even dibit pulses and generates position information used to control the radial position of heads over respective data tracks.

The signal induced in servo head 24 by the dibits in servo tracks 25 and 26 is fed to a preamplifier 33. Preamplifier 33 has two outputs 34A and 34B; the signal on output 34A is substantially the same as signal 32 and on output 34B is the inverse of such signal. See 35 in FIG. 8. Signals 32 and 35 form the inputs for a track following servo clock 36 embodying the present invention. Track following servo clock 36 has three outputs; (a) a dibit demodulator signal 36A for providing position information indicative of the position of servo head 24 relative to the boundary between adjacent odd and even tracks; (b) a sync pulse signal 36B for synchronizing the system clock pulse to the dibits on servo tracks 25 and 26; and (c) index clock signals 36C for facilitating detection of the index signals on the servo tracks.

The dibit demodulator signal is a timed gating signal which is employed to sense the output of servo head 24 only at times when a dibit signal is expected to be present and not at other times.

The sync pulse signal produced by the circuit of the present invention is used not only in controlling the timing of the circuit of the invention but also to control clock pulse timing in the read/write circuitry associated with read/write heads 23. As will appear a sync pulse is accurately produced even by servo tracks 25, 26 that are noisy or that have missing dibits to the end that information is recorded on information surfaces 21 at a constant linear density regardless of track speed.

The index clock signals produced by the circuit of the invention are used in sensing the index signal prerecorded on each servo track at one circumferential location thereon which indicates the start of the track. Because the index typically is constituted by a unique pattern of odd and even dibits recorded on the servo tracks at dibit intervals, improved detection of the index is accomplished by examining dibits only during specified, precisely defined periods. Such accurate detection is achieved because timing is based on the interval between even dibits or between odd dibits rather than the inverval between an even dibit and an odd dibit.

The dibit demodulator signal 36A is fed to circuitry identified in FIG. 1 as position electronics 37 which circuitry produces an output voltage having a magnitude and polarity indicative of the amount and direction of the location of servo head 24 with respect to a path midway between two adjacent servo tracks. Such signal is connected to an actuator control 38 which in turn controls an actuator 39 that effects movement of carriage 22 to an appropriate radial position with respect to shaft 14.

The sync pulse output 36B is employed to synchronize a phase-locked-oscillator 40 so that the clock pulse output of the phase-locked-oscillator is synchronized to the timing of the dibits. The ensuing description of the timing circit of the invention is based on a nominal clock pulse repetition rate of say 12.9 MHz when dibits in two adjacent tracks pass servo head 24 once every 1.24 microseconds; these parameters are nominal and result in a sync signal being produced at a rate one-sixteenth of the clock pulse output of phase-locked-oscillator 40. It is not intended to limit the invention to these particular parameters.

The index clock signals 36C constitute inputs to a circuit identified as index electronics 42 which accurately produces an index signal for each revolution of disks 16, 17 and 18. The index signal is employed in read/write circuitry 44 in order that the address on information storage surfaces 19 can be determined accurately at all times.

Track following servo clock 36, as shown in FIG. 4, is composed of two substantially identical signal channels A and B; to facilitate the succeeding description, elements in the respective channels having similar structure and function will be designated by the same reference numerals followed by "a" in respect to the upper channel and by "b" in respect to the lower channel. The signals entering the channels from preamp 33 are the inverse of one another. Such signals are first fed to pulse detectors 50a and 50b which are conventional circuit elements requiring no detailed description except to disclose that the circuits pass only positive going pulses that exceed a prescribed threshold. For convenience of illustration, the detected pulses passed by pulse detectors 50a and 50b are shown as square waves 52a and 52b in FIGS. 8 and 9. In the latter figure it will be seen that for an odd dibit pulse 52a leads pulse 52b from the same dibit and that for an even dibit pulse 52a lags pulse 52b for the same dibit.

Detected pulses 52a and 52b are fed to respective dibit pulse verification and shaper circuits 54a and 54b which circuits respond only to true dibits and produce outputs that are shaped both in magnitude and duration with uniformity for facilitating further processing of the signals.

Figure 5:
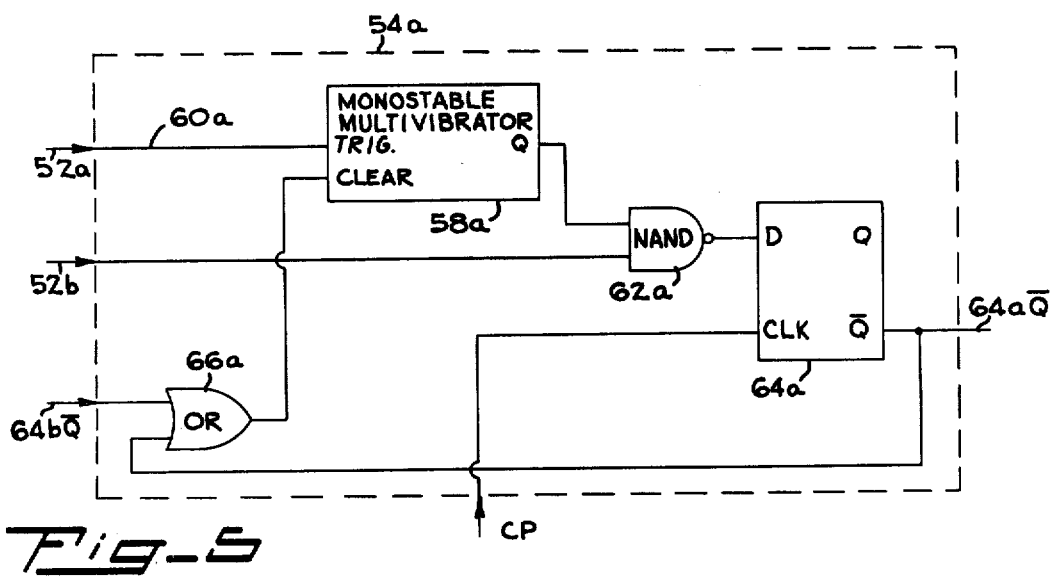
FIG. 5 is a block diagram of a dibit pulse verification and shaper circuit constituting an element of the circuit of FIG. 4.
Figure 8:
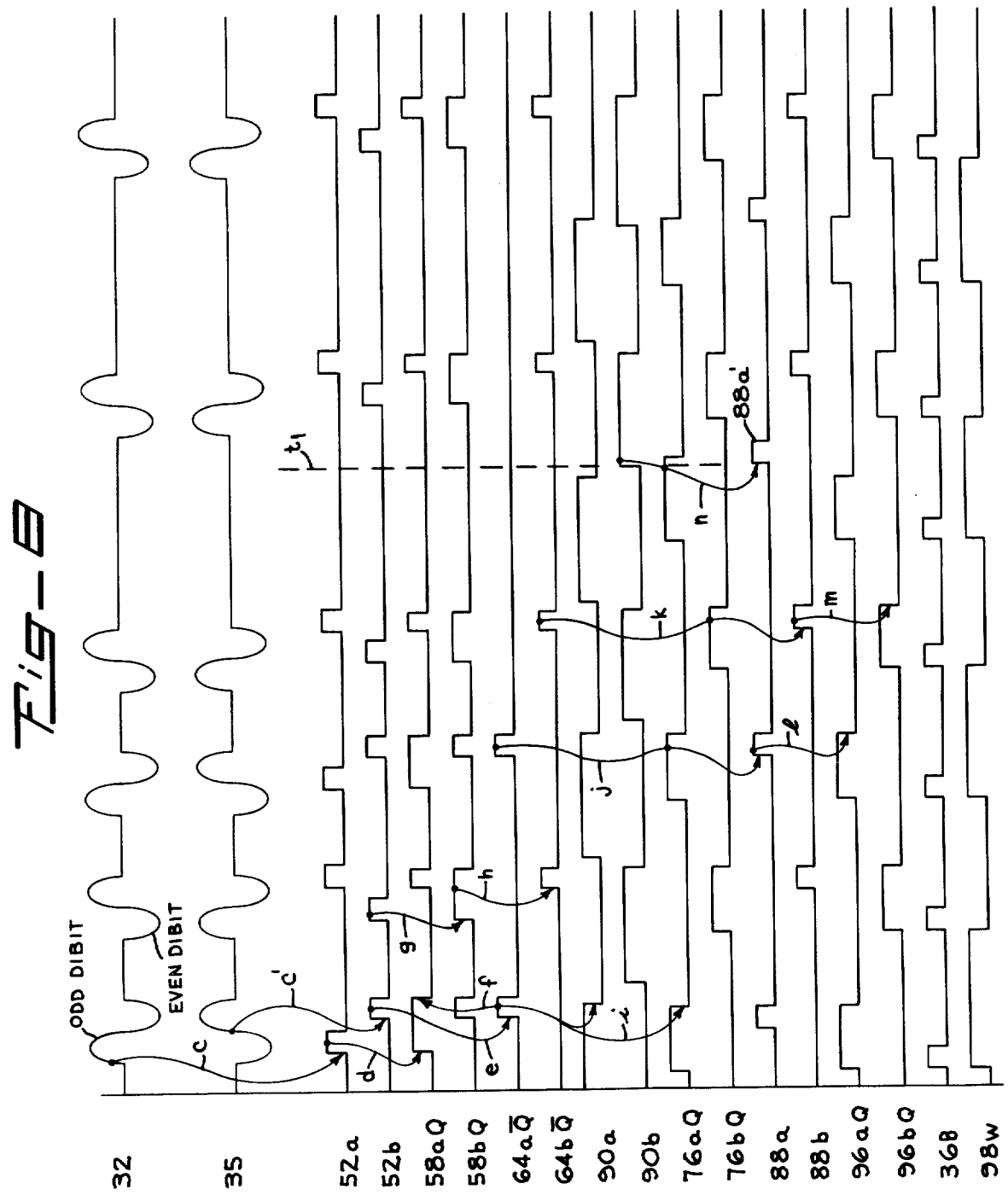
FIG. 8 is a timing diagram showing the relationship of signals present in the circuit of FIG. 4.

Having specific reference to FIG. 5, verification and shaper circuit 54a is shown in detail, it being understood that circuit 54b is substantially identical thereto. Dibit pulse verification and shaper circuit 54a includes a monostable multi-vibrator 58a which is triggered by pulse 52a connected to an input 60a which is the trigger input to the multi-vibrator. Accordingly, when a positive going pulse 52a in channel A is supplied at input 60a, multi-vibrator 58a is triggered. The timing circuitry for the monostable multi-vibrator is established so that the output remains high for a period substantially equal to the duration of a dibit pulse, such duration being graphically depicted at 58aQ in FIG. 8. The output of the same element in channel B is depicted in FIG. 8 at 58bQ.

Signal 58aQ is connected to one input of a two-input NAND gate 62a; the output of such gate is connected to the D input of a D-latch flip-flop 64a, which is clocked by output CP of PLO 40. To the other input of NAND gate 62a, the output 52b of pulse detector 50b is connected. Thus, if a detected pulse 52b from channel B occurs during the time that the output of monostable multi-vibrator 58a is high, the output of NAND gate 62a goes low wherefore the $\overline{Q}$ output of flip-flop 64a goes high to afford a signal representing detection of a true dibit in track 25. The $\overline{Q}$ output of flip-flop 64a is employed to clear monostable multi-vibrator 58a through an OR gate 66a, the OR gate having a second input from pulse verification and shaper circuit 54b which signal will likewise reset the monostable multi-vibrator. Thus, pulse verification and shaper circuit 54a produces an output 64a$\overline{Q}$ in response to movement of an odd dibit on servo surface 21 past servo head 24, and pulse verification and shaper circuit 54b produces an output 64b$\overline{Q}$ in response to an even dibit. Pulse verification and shaper circuit 54a does not respond to even dibits because monostable multi-vibrator 58a, although triggered by the positive going portion of an even dibit, is cleared by an output 64b$\overline{Q}$ from pulse verification circuit 54b before D-latch flip-flop 64a is triggered, the same mode of operation obtaining in the monostable multi-vibrator present in pulse verification and shaper circuit 54b with respect to odd dibits.

Outputs 64a$\overline{Q}$ and 64b$\overline{Q}$, which respectively represent odd and even dibits, are fed to pulse interval timers 68a and 68b, respectively. The timers function to produce a gate enabling signal at a time corresponding roughly to the typical dibit interval so that spurious signals occurring between dibits will not be passed. Timer 68a, which is exemplary of timer 68b, is shown in detail in FIG. 6. The timer includes a 4-bit binary counter 70a having a reset-to-zero input which is activated by the output of an OR gate 72a. Counter 70a is clocked at a rate one-half that of the PLO output, there being a divide-by-two circuit 73 to generate a clock signal CP/2 having a nominal repetition rate of 6.45 MHz. At the output of counter 70a, the QD($\div$16) and QB($\div$4) terminals are ANDed by an AND gate 74a to the J input of a J$\overline{K}$ flip-flop 76a such that the J input receives a high signal ten counts after the counter is reset. The ten count occurs after elapse of ten-sixteenths the interval between successive dibits. Because J$\overline{K}$ flip-flop 76a is clocked at 12.9 MHz by CP, its output 76aQ goes high 10½ counts after counter 70a is reset. The output 76aQ remains high and is ANDed with a pulse 64a$\overline{Q}$ produced by a succeeding dibit by circuitry to be described presently.

The Q output 76aQ of flip-flop 76a constitutes the output of pulse interval timer 68a and produces a gate enabling signal which is high during an interval following the occurrence of an odd dibit pulse such that the gate enabling signal corresponds to the expected time of occurrence of the succeeding dibit pulse. To achieve this mode of operation, counter 70a is clocked by a signal CP/2 having a repetition rate sixteen times that of the repetition rate of the odd or even dibits on the servo track passing servo head 24. Consequently, the period between adjacent odd or even dibits on a servo track is divided into sixteen equal increments. One input for resetting counter 70a through OR gate 72a is output 64a$\overline{Q}$ from pulse verification and shaper circuit 54a. Ten and one-half counts after occurrence of signal 64a$\overline{Q}$ interval timer 68a produces an output 76aQ. The half count arises because AND gate 74a supplies an input to flip-flop 76a after ten counts and flip-flop 76a is clocked by signal CP having twice the repetition rate of the clock signal CP/2 to counter 70a.

The gate enabling signal constituted by output 76aQ is connected to one of two inputs of each of a pair of AND gates 78a and 80a which constitute a part of an interval checker circuit 82a. When AND gates 78a and 80a are open, a succeeding dibit, sensed by pulse verification and shaper circuit 54a to produce an output 64a$\overline{Q}$, is connected over a signal line 84a to AND gate 78a in response to which the output of an OR gate 86a in interval checker 82a goes high. Occurrence of such signal resets counter 70a on a signal path 88a which is connected to one of the inputs of OR gate 72a in interval timer 68a. Resetting of counter 70a disables gate 78a and 80a because signal 76aQ goes low. Thus, an output at AND gate 78a indicates that the last dibit detected has occurred within a proper time interval after the dibit that preceded it.

Figure 6:
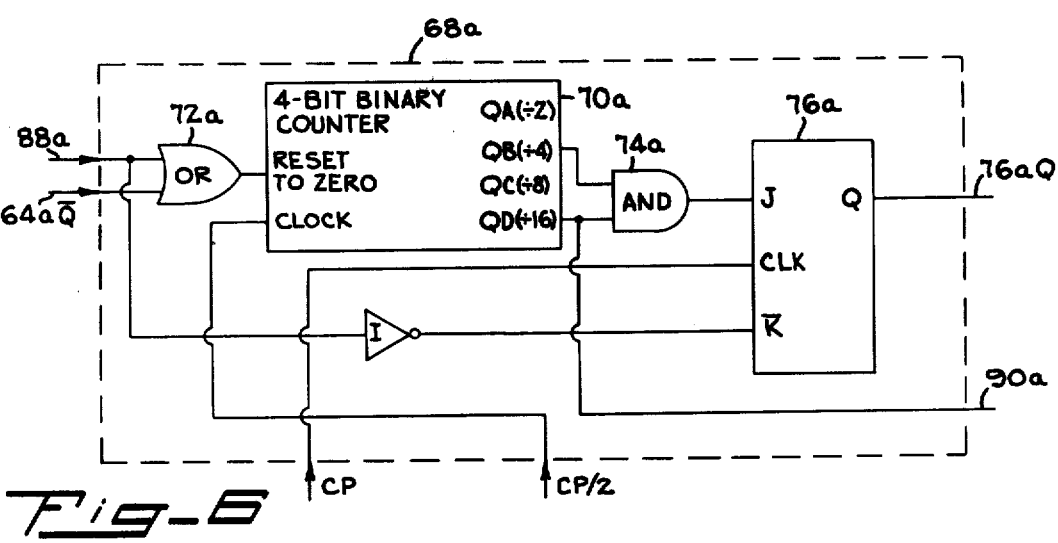
FIG. 6 is a block diagram of a pulse interval timer circuit constituting an element of the circuit of FIG. 4.

Interval checker circuits 82a and 82b also provide cross coupling between the channels so that absence of a dibit in one servo track will be filled in from the other track. AND gates 80a and 80b have inputs from the opposite channels on respective signal paths 90b and 90a. As can be seen in FIGS. 4 and 6, signal path 90a is connected to QD($\div$16) output of counter 70a and extends to AND gate 80b in interval checker 82b. Signal path 90b extends from the equivalent counter output in pulse interval timer 68b to AND gate 80a. The signal on path 90a goes high after one-half an odd dibit interval has elapsed after occurrence of an odd dibit as represented by a pulse at 64a$\overline{Q}$; thus a signal is cross coupled to AND gate 80b so that interval checker 82b will produce an output although an even dibit signal 64b$\overline{Q}$ does not occur to be gated through AND gate 78b when the latter gate is enabled. The signal on path 90b affords a similar function to fill in for odd dibits missing from channel A. Therefore, a signal 88a will appear at the output of interval checker 82a either upon coincidence of gate enabling signal 76aQ with a succeeding odd dibit in channel A or upon coincidence of the gate enabling signal with a signal on path 90b which occurs one-half the even-to-even dibit interval after an even dibit in channel B resets the counter in pulse interval timer 68b.

Figure 7:
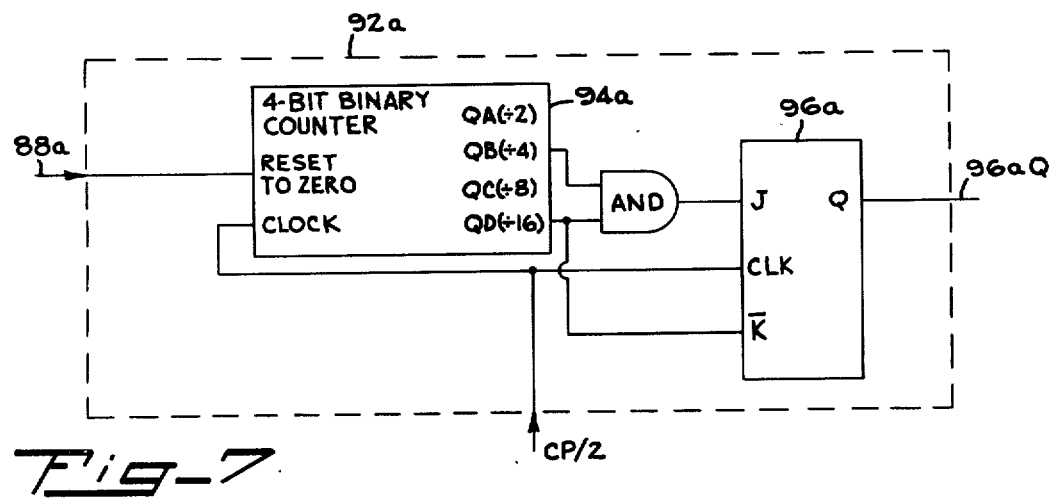
FIG. 7 is a block diagram of a sequence timer that constitutes an element of the circuit of FIG. 4.

The outputs 88a and 88b of interval checkers 82a and 82b are connected to the inputs of respective sequence timers 92a and 92b. FIG. 7 shows sequence timer 92a in detail, sequence timer 92b being substantially identical. The sequence timer includes a four bit binary counter 92a. The QB(÷4) and the QD(÷16) outputs of the counter are ANDed by an AND gate 95a to the J input of a J$\overline{K}$ flip-flop 96a. The $\overline{K}$ input of the flip-flop is connected to the QD(÷16) output of the counter. Both counter 94a and flip-flop 96a are clocked at a rate CP/2 so that the counter functions to divide the interval between successive odd dibits into sixteen equal periods. AND gate 95a is activated after elapse of ten-sixteenths of the interval between successive odd dibits, and accordingly, output 96aQ is high during the last six-sixteenths of the dibit interval. Because the sequence timer continues to count in the absence of a reset signal on terminal 88a, accurate timing is maintained notwithstanding the unlikely event of a noise pulse triggering pulse interval timer 68a so as to provide a gate enabling signal on terminal 76aQ at some time between successive odd dibits.

The outputs of 96aQ and 96bQ of respective timers 92a and 92b are fed to a PLO sync monostable or single shot multi-vibrator 97, the output of which provides a sync pulse at output 36B of PLO 40. Thus monostable multi-vibrator 97 is triggered in response to the presence of dibits on the servo tracks in alignment with servo head 24, and such synchronization is maintained even when several successive dibits are missing from the servo tracks because counter 94a in sequence timer 92a continues to trigger monostable multi-vibrator 97 at a sync rate and phase that are correct based on the last rate and phase induced by proper dibits on the servo tracks.

The outputs of sequence timers 92a and 92b are combined in a gated index clock generator 98 which produces a better defined time window 98w so as to assure coincidence with the dibits constituting the index for each track. Time window 98w and the output of an OR gate 99 constitute index clock signals 36C. The outputs 52a and 52b of pulse detectors 50a and 50b constitute the inputs to OR gate 99 so that index clock signals 36C include both timing information from time window 98w and dibit information from pulse detectors 50a and 50b thereby enabling index electronics 42 to produce reliable index signals.

Finally, the outputs 96aQ and 96bQ of sequence timers 92a and 92b activate demodulators 100a and 100b which constitute parts of position electronics 37. The demodulators open time windows only at the approximate time of occurrence of dibit signals induced in read head 24 so that accurate position information free of the influence of noise and the like can be produced to position the servo head and carriage 22 in an accurate manner.

The operation of the circuit of the present invention will be recapitulated by first assuming that servo head 24 is aligned midway between a perfect odd servo track 25 and a perfect even servo track 26. In response to relative movement between the servo head and the servo tracks there is induced in the servo head successive odd and even dibits represented at 32 in FIG. 8. Such signal together with its inverse 35 are fed to track following servo clock 36, thus signal 32 constituting the input to channel A of the circuit and signal 35 constituting the input to channel B of the circuit. Only the positive going portions of the respective servo head signals are transmitted through pulse detectors 50a and 50b thereby producing detected pulse signals respectively represented in FIG. 8 at 52a and 52b. In order to facilitate correlation of the operation of the circuits of FIGS. 4-7 with the timing diagrams of FIGS. 8 and 9, the latter figures are provided with curved arrows which extend from a dot on one curve to an arrow head on another curve; the dot represents the cause and the head the effect of a change of state of the circuit. Thus, curved arrow c indicates that the positive portion of an odd dibit produces a square dibit pulse 52a at the output of pulse detector 50a, and curved arrow c' indicates that the positive portion of the inverse of the odd dibit produces a square dibit pulse 52b at the output of pulse detector 50b. The first pulse in signal 52a (i.e., the leftwardmost pulse in FIG. 8) triggers monostable multi-vibrator 58a in dibit pulse verification and shaper circuit 54a (denoted by curved arrow d), thus causing one input of NAND gate 62a to go high. During the time that such gate input is high, a signal in 52b occurs, and the output of NAND gate 62a goes low, thus producing an output 64a$\overline{Q}$ (denoted by curved arrow e) upon occurrence of the next succeeding clock pulse CP from PLO 40. Signal 64a$\overline{Q}$ indicates detection of a correctly formed odd dibit; the signal also resets monostable multi-vibrator 58a as denoted by curved arrow f.

Referring again to signal 52a, the second pulse therein triggers monostable multi-vibrator 58a, but the multi-vibrator is reset by its internal timing circuitry before a signal from pulse detector 50b occurs. However, the second signal 52b in channel B sets the monostable multi-vibrator in verification and shaper circuit 54b (denoted by curved arrow g) so that when the second pulse 52a appears at the NAND gate connected to the output of such multi-vibrator, a signal 64b$\overline{Q}$ is produced (denoted by curved arrow h) indicating that a properly formed even dibit has been induced in servo head 24. Thus the monostable multi-vibrators function as timers for generating timing signals that have a duration approximating that of a single dibit.

The respective signals 64a$\overline{Q}$ and 64b$\overline{Q}$ reset the respective counters in pulse interval timers 68a and 68b thus causing the counters to commence their sixteen count at a rate CP/2 that is one-half the clock rate of PLO 40 (denoted by curved arrow i for channel A). When the respective counters reach the tenth count, the J$\overline{K}$ flip-flops, e.g., 76a, receive a high signal on their respective J inputs so that on the next pulse CP from PLO 40, the Q output of the respective flip-flops goes high, thus producing signals 76aQ and 76bQ. The respective signals 76aQ and 76bQ enable the AND gates in pulse interval checkers 82a and 82b so that when the succeeding odd or even dibits occur, AND gates 78a and 78b produce signals through OR gates 86a and 86b on respective signal paths 88a and 88b (denoted by curved arrows j and k) which indicate that a dibit has occurred within a preselected timed interval following the preceding dibit. The signal on paths 88a and 88b is used to reset the counters in respective pulse interval timers 68a and 68b and respective sequence timers 92a and 92b (denoted by curved arrows l and m) so that the timers produce output pulses which, through an output 36B from PLO monostable multi-vibrator 97, cause the PLO to produce clock pulses in synchronism with the timing and phase of the dibit pulses on servo surface 21 moving with respect to servo head 24.

Designation of the counters in pulse interval timers 68a and 68b as 4-bit binary counters is a specific example of a counter that produces $2^n$ counts during the interval between successive dibits, wherein n is a positive integer, 4 in the specific example. The connection of AND gate 74a so as to respond to the tenth count exemplifies means for producing an enabling signal that commences after the center or halfway point of an odd-to-odd dibit interval so as to enable detection of the next dibit but to render the circuit substantially immune to noise occurring during the majority of the interval between successive dibits.

So long as the assumed conditions exist, i.e., substantially complete servo tracks 25 and 26 and correct alignment of servo head 24 with the servo tracks, system operation proceeds as has just been described.

One imperfection that frequently exists in tracks 25 and 26 on servo surface 21 is the presence of noise, i.e., portions of the servo surface between adjacent dibits may contain unintended magnetic discontinuities which induce signals in servo head 24. A track following servo clock according to the present invention provides immunity from the effect of such noise pulses in three different ways. First, only dibit pulses having a certain magnitude are passed by pulse detectors 50a and 50b thus eliminating from the circuitry any noise pulses having a magnitude less than the threshold magnitude of the pulse detectors. Second, dibit pulse verification and shaper circuits 54a and 54b pass only dibits that have both positive and negative going portions that occur within a given time period as established by monostable multi-vibrator 58a and its counterpart in pulse verification and shaper circuit 54b. Because it is highly unlikely that a noise pulse will conform to these requirements, such noise pulse will not be passed by the dibit pulse verification and shaper circuits. Third, even if a noise pulse should have positive and negative going portions such as to be passed by the dibit pulse verification and shaper circuits, it is highly unlikely that the noise pulse will be spaced from a dibit pulse by the proper interval. Pulse interval timer circuits 68a and 68b function to pass only pulses arising in servo head 24 that follow a dibit pulse by a prescribed interval so that noise pulses occurring at some other time will not be passed through the pulse interval timers. Consequently, noise pulses in servo tracks 25 and 26 are not passed through the circuit and therefore cannot adversely affect proper synchronization of PLO 40.

Another defect that can occur in servo tracks 25 and 26 of servo surface 21 is the absence of one or more dibits in the tracks. Such defect can arise, for example, when the magnetizable coating on servo surface 21 has small voids thereon. The circuit of the present invention compensates for missing dibits in two ways. First, the cross connection between channels A and B at pulse interval timer 68a and 68b and pulse interval checkers 82a and 82b functions to fill in from one track (say an even track) for missing dibits in the opposite track (say an odd track). Such mode of operation is achieved because counter 70a in pulse interval timer 68a and its couterpart in pulse interval timer 68b produces a signal after an eight count, i.e., after one-half of the interval between successive dibits has occurred. Such half interval signals (carried over signal paths identified in FIG. 4 at 90A and 90B) are fed to respective AND gates 80b and 80a so that the associated interval checkers 82b and 82a will produce an output when AND gates 80b and 80a are enabled by the outputs 76aQ and 76bQ from the counters in respective pulse interval timers 68b and 68a. More specifically, and in reference to FIG. 8, there is a missing odd dibit at time $t_1$. The consequence of this is that flip-flop 64a in pulse verification and shaper circuit 54a will not produce an output signal 64aQ at time $t_1$ so that counter 70a in pulse interval timer 68a will not receive a reset signal 64aQ. Therefore AND gate 78a will not produce an output. Gate 80a will produce an output, however, because of coincidence of gate enabling signal 76aQ and a signal on path 90b from the counter in pulse interval timer 68b (denoted by curved arrow n). The signal 88a' so produced resets the counters in sequence timer 92a and pulse interval timer 68a at a time midway between successive even dibits, which is the approximate time that an odd dibit would normally occur.

The foregoing mode of operation demonstrates the improved accuracy of timing afforded by the present invention because the timing of compensation for missing dibits is based on the odd-to-odd or even-to-even dibit interval, which can be recorded with great accuracy and uniformity, rather than being based on the odd-to-even dibit interval, which is typically not accurate or uniform.

Figure 9:
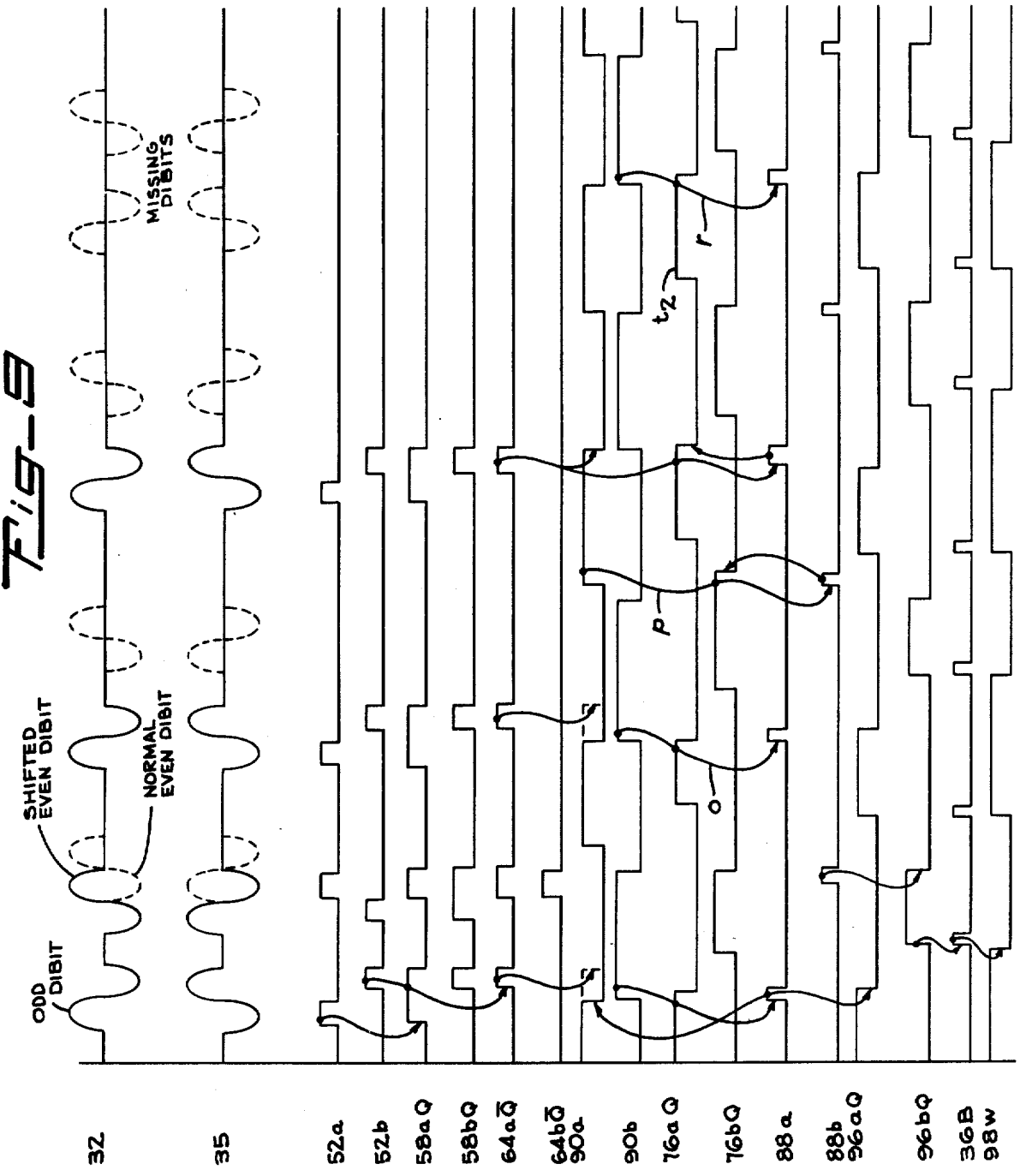
FIG. 9 is similar to FIG. 8 and illustrates system oepration to compensate for servo track defects.

The inaccuracy and non-uniformity of the odd-to-even dibit interval would, if not compensated for, produce irregular timing. The present invention compensates for shifts between odd dibits and even dibits, a situation exemplified at the left-hand side of FIG. 9. In FIG. 9 the normal position of the first even dibit is shown in broken lines in curves 32 and 35 and the shifted position of such even dibit is shown in solid lines. Succeeding missing dibits are also shown in dotted lines. The time of occurrence of the shifted even dibits causes a leftward shift in curve 90b so that such signal goes high during the presence of gate enabling system 76aQ before the occurrence on gate 78a of a pulse 64aQ. Consequently, gate 80a produces an output denoted by curved arrow o in FIG. 9. Such shift arises because of the cross coupling afforded by the invention so that the reset pulses in curve 88a, representative of odd dibits, shift in response to a shift in position of even dibits so that the regular and uniform repetition of PLO sync pulses 36B is preserved even in the presence of such shift. As is denoted by curved arrow p in FIG. 9, the next reset pulse in curve 88b, representative of an even dibit, occurs in response to coincidence between signal 90a and gate enabling signal 76bQ so that timing is at all times dictated by the odd-to-odd interval or the even-to-even interval, which, as has been stated, is quite accurate and uniform.

At the right-hand side of FIG. 9 is illustrated the operation of the system in maintaining timing and synchronization notwithstanding the temporary absence of both odd dibits and even dibits. For this case the reset pulses in curve 88b are produced by coincidence of gate enabling signal 76bQ and cross connection signal 90a and the reset pulses in curve 88a are produced by coincidence between gate enabling signal 76aQ and cross connection signal 90b. When dibits recur on dibit tracks 25 and 26, however, signals 64a$\overline{Q}$ and 64b$\overline{Q}$ will recur and such signals will be gated in respective AND gates 78a and 78b by coincidence with gate enabling signal 76aQ and 76bQ.

Thus it will be seen that the present invention provides a track following servo clock for a data storage disk pack assembly that achieves synchronization of the system clock pulse generating PLO even when the servo surface of the disk pack has noise defects or missing dibit defects. The system is arranged virtually to eliminate any influence from noise on the servo tracks and is adapted to establish synchronization from one of the two tracks and even to continue the synchronization from the last proper dibits in the case where dibits are missing from both tracks. The invention has been described in connection with one preferred system in which it provides salutary advantages. The invention is not limited to such specific system because, as will be obvious to those skilled in the art, other adaptations and modifications can be made without departing from the true spirit and scope of the invention.

What is claimed is:

1. In a track following data storage system of the type which has at least a first servo track having a magnetization pattern of a first type interrupted by relative short magnetizations of a second type, a second servo track juxtaposed to said first servo track and having a magnetization pattern of said second type interrupted by relatively short magnetizations of said first type, the relatively short designations in said first track being offset from the relatively short designations in said second track, signal producing means operatively associated with said servo tracks for producing in response to relative movement with respect to said servo tracks a first signal having successive dibit pairs formed by positive and negative portions of amplitudes representative of the lateral position of said signal producing means relative to the tracks and a second signal that is the inverse of the first signal, and a phase-locked-oscillator having a sync input and producing a clock pulse in phase with signals applied to the sync input, an improved timing circuit for synchronizing said phase-locked-oscillator to the rate at which the relatively short magnetizations move relative to said signal producing means comprising a first detector coupled to said signal producing means for producing a first rectified signal representative of only the positive portions of said first signal, a second detector coupled to said signal producing means for producing a second rectified signal, a first timer coupled to said first detector for generating a first timing signal having a duration approximating that of a single dibit, a second timer coupled to said second detector for generating a second timing signal having a duration approximating that of a single dibit, first gating means responsive to said first timer and said second detector for producing upon coincidence of said first timing signal and said second rectified signal a first verified pulse representative of a dibit of a first polarity, second gating means responsive to said second timer and said first detector for producing upon coincidence of said second timing signal and said first rectified signal a second verified pulse representative of a dibit of a second polarity opposite from said first polarity, and means coupling said first and second verified pulses to the sync input of said phase-locked-oscillator.

2. A timing circuit according to claim 1 wherein said coupling means comprises a first counter for measuring the interval between successive first verified pulses, said first counter having a reset input coupled to said first gating means and producing $2^n$ timing pulses during the interval between each pair of successive first verified pulses, a second counter for measuring the interval between successive second verified pulses, said second counter having a reset input coupled to said second gating means and producing $2^n$ timing pulses during the interval between each pair of successive second verified pulses, said counters being clocked in response to said phase-locked-oscillator and n being a positive integer, a first switch means coupled to said first counter for producing a first enabling signal commencing after said first counter counts $2^n/2$ of the interval between successive first verified pulses, a second switch means coupled to said second counter for producing a second enabling signal commencing after said second counter counts $2^n/2$ of the interval between successive second verified pulses, first means for ANDing said first enabling signal with a succeeding first verified pulse, second means for ANDing said second enabling signal with a succeeding second verified pulse, means coupling the outputs of said ANDing means to the sync input of said phase-locked-oscillator, first connecting means for coupling the output of said first ANDing means to the reset input of said first counter to effect reset thereof notwithstanding absence of a succeeding first verified pulse, and second coupling means for connecting the output of said second ANDing means to the reset input of said second counter to effect reset thereof notwithstanding absence of a second verified pulse.

3. A timing circuit according to claim 2 including a first cross coupling AND gate having an output connected in common with the output of said first ANDing means, a second cross coupling AND gate having an output connected in common with the output of said second ANDing means, said first cross coupling AND gate having an enabling input coupled to said first switch means, said second cross coupling AND gate having an enabling input coupled to said second switch means, said first cross coupling AND gate also having an input coupled to the counter output of said second counter so as to afford resetting of said first counter at a time approximately midway of the interval between successive said second verified pulses, and said second cross coupling AND gate also having an input coupled to the counter output of said first counter so as to afford resetting of said second counter at a time approximately midway of the interval between successive said first verified pulses.

4. A timing circuit according to claim 1 wherein said coupling means comprises a first counter for producing a first preselected counting pulse approximately midway between successive first verified pulses, a second counter for producing a second preselected counting pulse approximately midway between successive second verified pulses, each said counter having a reset input coupled to receive respective said verified pulses so as to be reset by respective said verified pulse, a first cross coupling gate connected to the reset input of said first counter for producing a reset pulse in response to said second preselected counting pulse so as to reset said first counter after production of the preselected counting pulse notwithstanding absence of a first verified pulse at said reset input, a second cross coupling gate connected to the reset input of said second counter for producing a reset pulse in response to said first preselected counting pulse so as to reset said second counter after production of the preselected counting pulse notwithstanding absence of a second verified pulse at said reset input, said gates being connected to the sync input of said phase-locked oscillator.

5. In a track following data storage system of the type which has at least a first servo track having a magnetization pattern of a first type interrupted by relative short magnetizations of a second type, a second servo track juxtaposed to said first servo track and having a magnetization pattern of said second type interrupted by relatively short magnetizations of said first type, the relatively short designations in said first track being offset from the relatively short designations in said second track, signal producing means operatively associated with said servo tracks for producing in response to relative movement with respect to said servo tracks a first signal having successive dibits formed by positive and negative portions of amplitudes representative of the lateral position of said signal producing means relative to the tracks and a second signal that is the inverse of the first signal, and a phase-locked-oscillator having a sync input and producing a clock pulse in phase with signals applied to the sync input, an improved timing circuit for synchronizing said phase-locked-oscillator to the rate at which said relatively short magnetizations move relative to said signal producing means comprising a first detector coupled to said signal producing means for producing first dibit pulses representative of signals induced in said signal producing means in response to movement of said first servo track relative thereto, a second detector coupled to said signal producing means for producing second dibit pulses representative of signals induced in said signal producing means in response to movement of said second servo track relative thereto, a first counter having a reset input terminal coupled to said first detector and a second counter having a reset input terminal coupled to said second detector, said counters being clocked by said phase-locked-oscillator to produce $2^n$ counting pulses during the interval between respective said first and second dibit pulses, n being a positive integer, first switch means associated with said first counter and responsive thereto for producing a first enabling signal after $2^n/2$ counts by said first counter, a first AND gate associated with said first switch means and having one input coupled to said first enabling signal, another input coupled to said first detector and an output producing a first sync signal in response to coincidence of a succeeding first dibit pulse and said first enabling signal, second switch means associated with said second counter and responsive thereto for producing a second enabling signal after $2^n/2$ counts by said second counter, a second AND gate associated with said second switch means and having one input coupled to said second enabling signal, another input coupled to said second detector and an output producing a second sync signal in response to coincidence of a succeeding second dibit pulse and said second enabling signal, and means coupling said first and second sync signals to said phase-locked-oscillator so that said phase-locked-oscillator is synchronized in phase with successive dibit signals.

6. A timing circuit according to claim 5 including a first cross coupling AND gate having an output connected in common with the output of said first AND gate, a second cross coupling AND gate having an output connected in common with the output of said second AND gate, said cross coupling AND gates having enabling inputs coupled to respective said switch means, said first cross coupling AND gate also having an input coupled to the output of said second counter so as to afford resetting of said first counter at a time approximately midway of the interval between successive said second dibit pulses thereby resetting said first counter from second cross coupling AND gate notwithstanding absence of a first dibit pulse, said second auxiliary gate also having an input coupled to the output of said first counter so as to afford resetting of said second counter at a time approximately midway of the interval between successive said first dibit pulses thereby resetting said second counter from said first auxiliary AND gate notwithstanding absence of a second dibit pulse.

7. A timing circuit according to claim 5 wherein said coupling means comprises a first sequence counter for producing a preselected number of counting pulses between successive said first dibit pulses, a second sequence counter for producing a preselected number of counting pulses between said second dibit pulses, said first sequence counter having a first reset input coupled to said first dibit pulse so as to be reset by said first dibit pulse, said second sequence counter having a second reset input connected to said second dibit pulse so as to be reset by said second dibit pulse, first gating means having an input connected to the output of said first sequence counter for producing a sync pulse in response to said first counter reaching said preselected number, said first sequence counter continuing to count so as to activate said first gating means notwithstanding absence of a first dibit pulse at said first reset input, and second gating means having an input connected to the output of said second sequence counter for producing a sync pulse in response to said second reset counter reaching said preselected number, said second sequence counter continuing to count so as to activate said second gating means notwithstanding absence of a second dibit pulse at said second reset input.

8. A timing circuit according to claim 5 wherein said first detector includes a first rectifying means for producing a first rectified signal representative of only the positive portions of said first signal induced in said servo head, said second detector includes a second rectifying means for producing a second rectified signal representative of only the positive portions of said second signal induced in said servo head, a first timer responsive to said first rectified signal for generating a first timing signal having a duration approximating that of a single dibit, a second timer responsive to said second rectified signal for generating a second timing signal having a duration approximating that of a single dibit, first gating means responsive to said first timer and said second rectifying means for producing a first verified pulse upon coincidence of said first timing signal and said second rectified signal, second gating means responsive to said second timer and said first rectifying means for producing a second verified pulse upon coincidence of said second timing signal and said first rectified signal, and means connecting said first and second verified pulses to respective said counter input terminals.

9. A method for synchronizing a clock pulse generator to the rate of movement of magnetic dibits on a servo surface that moves with respect to a servo head to induce in the servo head dibit pulses at a rate determined by the speed of such movement, said method comprising the steps of forming an inverted signal that is the inverse of the dibit signal induced in the servo head, rectifying the signal induced in the servo head and the inverted signal so as to generate first and second pulse trains composed of only the positive portions of respective said signals, providing first and second triggerable timers, triggering the timers by respective pulses in the first and second pulse trains, gating the respective timers with the rectified pulses in the opposite pulse trains to effect a cross connection between the first and second trains and to produce first and second sync signals only when a rectified pulse in one pulse train follows a rectified pulse in the other pulse train by a preselected interval established by the timers, and synchronizing the clock pulse generator in phase with the sync signals.

10. A method for synchronizing a clock pulse generator to the rate at which prerecorded magnetic dibits move with respect to a servo head and induce in the servo head dibit signals comprising the steps of providing a resettable counter that produces a plurality of pulses between successive dibit signals, resetting the counter with a dibit signal, gating the output of the counter to produce an enabling signal, only near the end of the count so that the enabling signal has a duration substantially less than the period between successive dibit signals, generating a sync signal only when a successive dibit signal coincides with the enabling signal, and sychronizing the clock pulse generator in phase with the sync signal.

* * * * *